United States Patent
Kim et al.

(10) Patent No.: US 8,070,169 B2
(45) Date of Patent: Dec. 6, 2011

(54) ACTUATOR FOR ACTIVE ROLL CONTROL SYSTEM

(75) Inventors: Sung Jun Kim, Hwaseong (KR); Hae Ryong Choi, Seoul (KR); Sang Ho Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 12/499,523

(22) Filed: Jul. 8, 2009

(65) Prior Publication Data

US 2010/0007103 A1  Jan. 14, 2010

(30) Foreign Application Priority Data

Jul. 10, 2008  (KR) .................. 10-2008-0067165

(51) Int. Cl.
*B60G 17/015* (2006.01)
(52) U.S. Cl. ............... 280/5.511; 280/5.506; 280/5.515
(58) Field of Classification Search ............... 280/5.508, 280/5.502, 5.511, 5.506, 5.507, 5.515, 124.106, 280/124.137
See application file for complete search history.

(56) References Cited

U.S. PATENT DOCUMENTS

| | | | | |
|---|---|---|---|---|
| 5,186,486 | A * | 2/1993 | Hynds et al. | 280/124.107 |
| 5,217,095 | A * | 6/1993 | Lizell | 188/266.5 |
| 5,296,785 | A * | 3/1994 | Miller | 318/254.1 |
| 5,491,633 | A * | 2/1996 | Henry et al. | 701/36 |
| 5,597,180 | A * | 1/1997 | Ganzel | 280/124.106 |
| 5,632,502 | A * | 5/1997 | Oppitz et al. | 280/124.106 |
| 5,678,847 | A * | 10/1997 | Izawa et al. | 280/5.515 |
| 6,354,607 | B1 * | 3/2002 | Kawashima et al. | 280/5.511 |
| 6,857,787 | B1 * | 2/2005 | Meier et al. | 384/619 |
| 6,981,428 | B2 * | 1/2006 | Donald et al. | 74/89.26 |
| 7,226,056 | B2 * | 6/2007 | Barron | 280/5.511 |
| 7,311,316 | B2 * | 12/2007 | Yasui et al. | 280/5.511 |
| 7,357,229 | B2 * | 4/2008 | Kondo et al. | 188/267 |

(Continued)

FOREIGN PATENT DOCUMENTS

JP  62139767 A  *  6/1987

(Continued)

OTHER PUBLICATIONS

Unknown Author, Anti Roll control device, Apr. 20, 1993, JPO, JP 5-29807 U, Machine Translation of Description.*

*Primary Examiner* — Faye M Fleming
*Assistant Examiner* — James English
(74) *Attorney, Agent, or Firm* — Morgan, Lewis & Bockius LLP

(57) ABSTRACT

An actuator for an active roll control system that connects a stabilizer bar with a lower arm may include a screw housing having a space, a power transmitter slidably mounted in an upper interior circumference of the screw housing, and having an upper end portion connected to one end of the stabilizer bar and a lower end portion slidably movable in the space wherein the lower end portion of the power transmitter includes a screw groove and a screw thread is formed at an interior circumference of an inlet portion, a lead screw being inserted in the screw groove of the power transmitter and threaded to the screw thread of the inlet portion and having a screw rotation shaft integrally connected to a lower end thereof, and a drive motor mounted at a lower portion of the screw housing and having a rotation shaft connected to the screw rotation shaft.

5 Claims, 5 Drawing Sheets

U.S. PATENT DOCUMENTS

| | | | |
|---|---|---|---|
| 7,621,539 B2 * | 11/2009 | Choi et al. | 280/5.52 |
| 7,735,937 B2 * | 6/2010 | Chonan | 301/124.2 |
| 2002/0089107 A1 * | 7/2002 | Koh | 267/218 |
| 2003/0204293 A1 * | 10/2003 | Shiino et al. | 701/37 |
| 2005/0115343 A1 * | 6/2005 | Sakamaki | 74/89.23 |
| 2005/0211516 A1 * | 9/2005 | Kondo et al. | 188/267 |
| 2007/0080509 A1 * | 4/2007 | Kim | 280/5.52 |
| 2008/0079225 A1 * | 4/2008 | Choi et al. | 280/5.52 |
| 2009/0121398 A1 * | 5/2009 | Inoue | 267/140.14 |
| 2009/0267311 A1 * | 10/2009 | Ohnuma et al. | 280/5.507 |
| 2010/0032913 A1 * | 2/2010 | Kim | 280/5.509 |

FOREIGN PATENT DOCUMENTS

| | | | |
|---|---|---|---|
| JP | 5-29807 U | | 4/1993 |
| JP | 08152038 A | * | 6/1996 |
| JP | 2005090616 A | * | 4/2005 |
| JP | 2007-269164 A | | 10/2007 |
| JP | 2008-087753 A | | 4/2008 |
| KR | 10-2009-0064095 A | | 6/2009 |

* cited by examiner

ACTUATOR FOR ACTIVE ROLL CONTROL SYSTEM

CROSS-REFERENCE TO RELATED APPLICATION

The present application claims priority to Korean Patent Application Number 10-2008-0067165 filed on Jul. 10, 2008, the entire contents of which application is incorporated herein for all purposes by this reference.

BACKGROUND OF THE INVENTION

Field of the Invention

The present invention relates to an actuator for an active roll control system. More particularly, the present invention relates to an actuator for an active roll control system that varies torsional rigidity of a stabilizer bar and is capable of actively controlling roll of a vehicle as a consequence that a lead screw in a screw housing converts rotation movement of a motor into linear reciprocal movement and transmits the linear reciprocal movement to a power transmitter connected to one end of the stabilizer bar by a joint.

Description of Related Art

Generally, a suspension system of a vehicle connects an axle to a vehicle body so as to control vibration or impact transmitted from a road to the axle when driving not to be directly transmitted to the vehicle body. Accordingly, the suspension system of a vehicle prevents the vehicle body and freight from being damaged and improves ride comfort.

Such a suspension system, as shown in FIG. 1, includes a chassis spring 101 relieving impact from the road, a shock absorber 103 reducing free vibration of the chassis spring 101 and improving the ride comfort, and a stabilizer bar 105 suppressing roll of a vehicle (it means that a vehicle inclines with reference to a length direction of the vehicle body).

Both sides of the stabilizer bar 105 is mounted at the vehicle body 107, and both ends of the stabilizer bar 105 is mounted at a lower arm 109 or a strut bar (not shown). Therefore, in a case that left and right wheels 111 move to the same direction (upward direction or downward direction), the stabilizer bar 105 does not work. On the contrary, in a case that the left and right wheels 111 move to the opposite direction (one moves upwardly and the other moves downwardly), the stabilizer bar 105 is twisted and suppresses the roll of the vehicle body 107 by torsional restoring force.

That is, when the vehicle body 107 inclines toward a turning axis by the centrifugal force in a case of turning or heights of the left and right wheels is different from each other by bump or rebound of the vehicle, the stabilizer bar 105 is twisted and stabilizes position of the vehicle body by torsional restoring force.

However, a conventional stabilizer bar 105 suppresses inclination of the vehicle or restores the inclined vehicle body 107 by only using torsional restoring force of the stabilizer bar 105, it is difficult to control roll of the vehicle quickly and precisely. In order to solve above-mentioned problem, an active roll control system provided with an actuator having a hydraulic pressure cylinder 113 connected to one end of stabilizer bar 105 and controlling the roll of the vehicle actively is developed.

According to an active roll control system that controls the roll of the vehicle actively by using the hydraulic pressure cylinder 113, one lower arm 109 is connected to one end of the stabilizer bar 105 by a stabilizer link 115 and the other lower arm 109 is connected to the other end of the stabilizer bar 105 by the hydraulic pressure cylinder 113, as shown in FIG. 2.

Therefore, the active roll control system stabilizer bar 105 changes torsional rigidity of the stabilizer bar 105 by changing a length between the other end of the stabilizer bar 105 and the lower arm 109.

That is, according to the active roll control system, a lower end of the hydraulic pressure cylinder 113 is connected the other lower arm 109, and an upper end of piston rod 117 of the hydraulic pressure cylinder 113 is connected to the other end of the stabilizer bar 105 by a ball joint 119.

Therefore, an ECU controls a hydraulic pressure system including a valve and a hydraulic pressure pump based on signals output from an acceleration sensor, a vehicle height sensor, and a steering sensor, and improves the roll of the vehicle according to the active roll control system.

Since the conventional active roll control system has the actuator provided with the hydraulic pressure cylinder 113, the hydraulic pressure supply system for supplying and controlling hydraulic pressure including a hydraulic pressure pump, a hydraulic pressure valve, and a hydraulic line is very complex. Thus, an additional bracket 121 is required in order to mount the hydraulic pressure cylinder 113, and the conventional active roll control system has drawbacks in layout.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an actuator for an active roll control system having advantages of enhanced controllability and simplified layout as a consequence that a lead screw in a screw housing converts rotation movement of a motor into linear reciprocal movement and transmits the linear reciprocal movement to a power transmitter connected to one end of the stabilizer bar by a joint.

In an aspect of the present invention, the present invention may disperse impact transmitted from a vehicle body and a road through a power transmitter and preventing a drive motor from being damaged by interposing impact absorbing unit between the screw housing and the screw rotation shaft.

The actuator for an active roll control system that connects a stabilizer bar with a lower arm and actively improves roll of a vehicle by changing torsional rigidity of the stabilizer bar according to a driving condition of the vehicle, may include a screw housing having a space formed therein, a power transmitter slidably mounted in an upper interior circumference of the screw housing, and having an upper end portion connected to one end of the stabilizer bar by a joint and a lower end portion slidably movable in the space of the screw housing, wherein the lower end portion of the power transmitter includes a screw groove therein and a screw thread is formed at an interior circumference of an inlet portion thereof, a lead screw being inserted in the screw groove of the power transmitter and threaded to the screw thread of the inlet portion and having a screw rotation shaft integrally connected to a lower end thereof, and a drive motor mounted at a lower portion of the screw housing and having a rotation shaft connected to the screw rotation shaft.

The drive motor may be mounted at the lower portion of the screw housing by an end bell.

The rotation shaft of the drive motor may be connected to the screw rotation shaft by a coupling.

An impact absorbing unit for absorbing and dispersing impact may be disposed between the screw rotation shaft and the screw housing.

The impact absorbing unit may include a metal bush mounted in the screw housing in a state of being inserted on the screw rotation shaft, a thrust disk disposed under the metal bush and insertedly mounted on the screw rotation shaft, upper and lower thrust bearings inserted on the screw rotation shaft, and mounted corresponding respectively to upper and lower surfaces of the thrust disk, and bearing plates mounted respectively at an upper surface of the upper thrust bearing and a lower surface of the lower thrust bearing.

A damper for absorbing impact to an interior surface of the space in the screw housing may be provided at a lower end portion of the space in the screw housing.

An upper end of the screw housing may be provided with a guide bush that is contacted with an exterior circumference of the power transmitter and guides sliding movement of the power transmitter, and a bush housing in which an oil seal for preventing leakage of oil is mounted around the guide bush.

The drive motor may be a step motor capable of controlling rotation speed and rotating direction thereof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
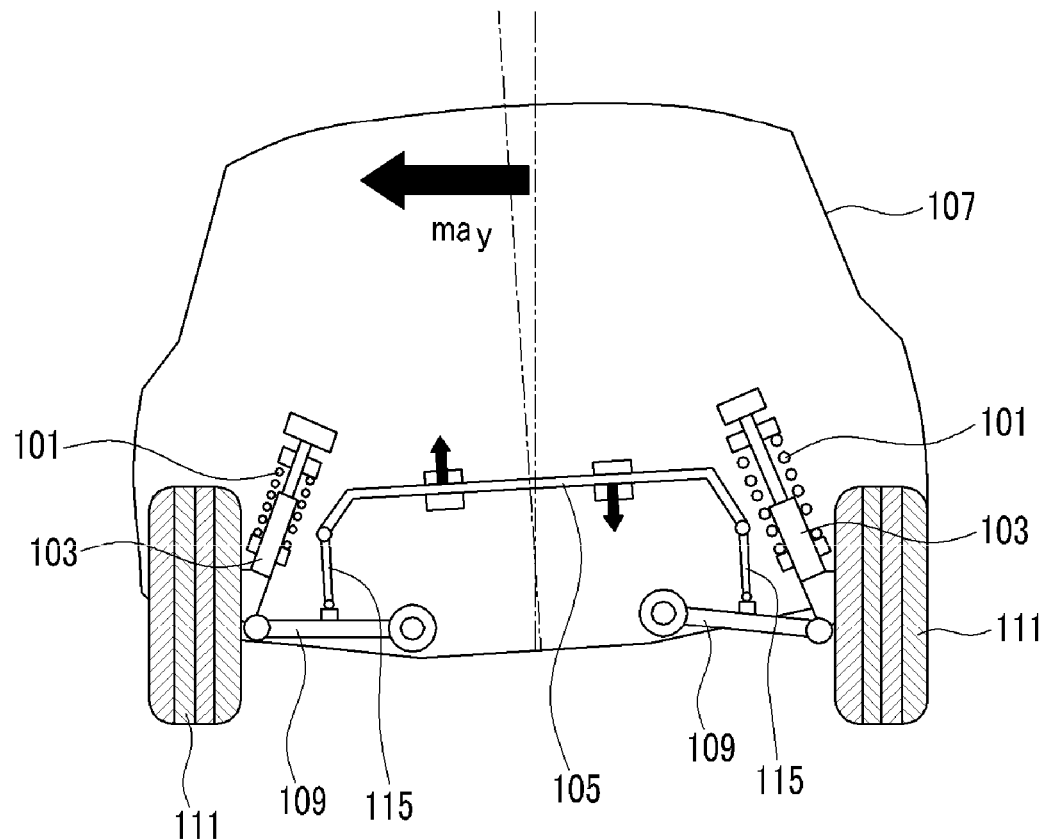
FIG. 1 is a schematic diagram of a conventional suspension system for vehicles.
Figure 2:
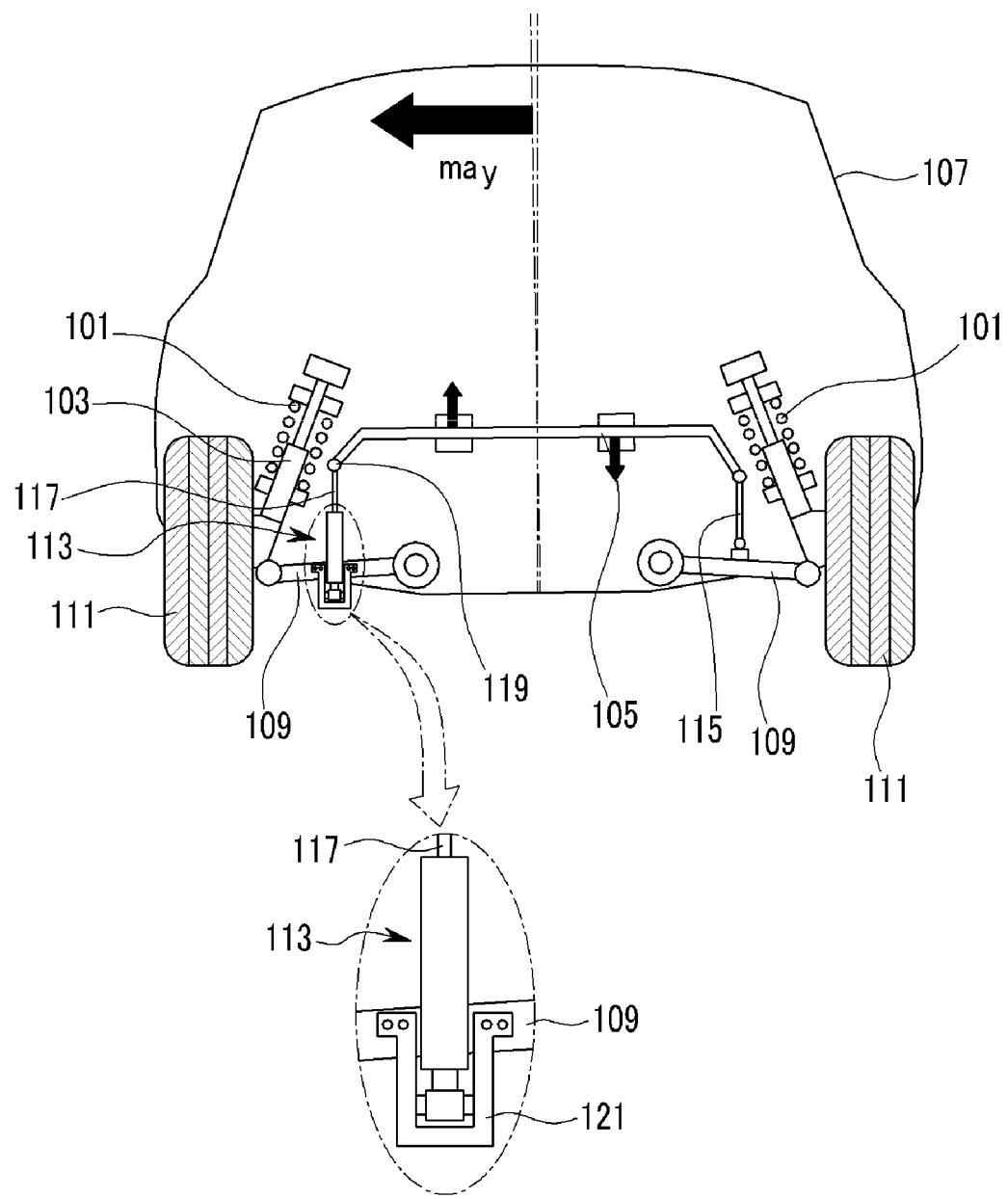
FIG. 2 is a schematic diagram of a conventional suspension system for vehicles provided with an actuator for an active roll control system.
Figure 3:
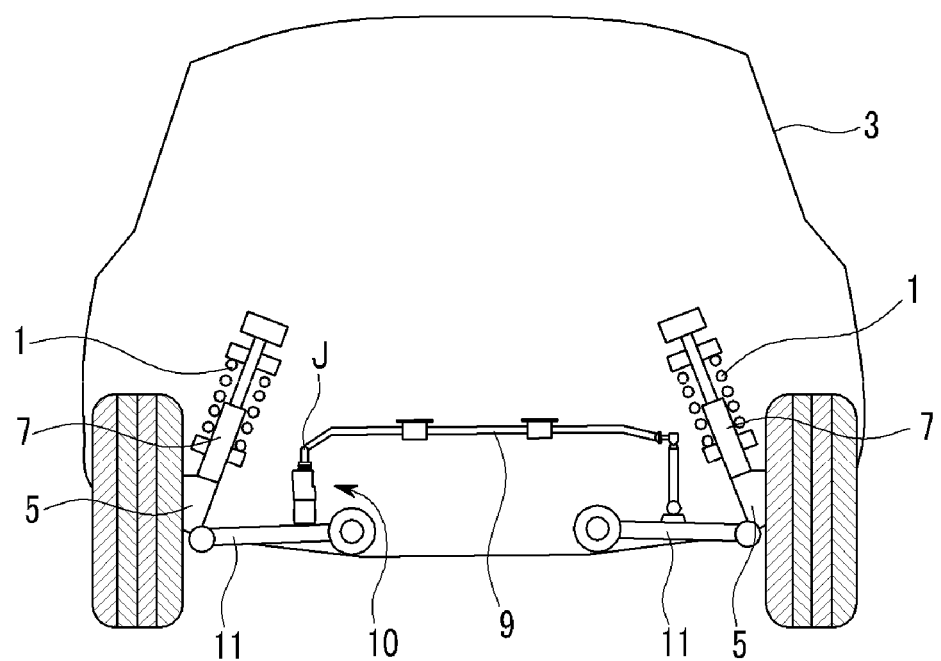
FIG. 3 is a schematic diagram of an exemplary suspension system for vehicles provided with an actuator for an active roll control system according to the present invention.
Figure 4:
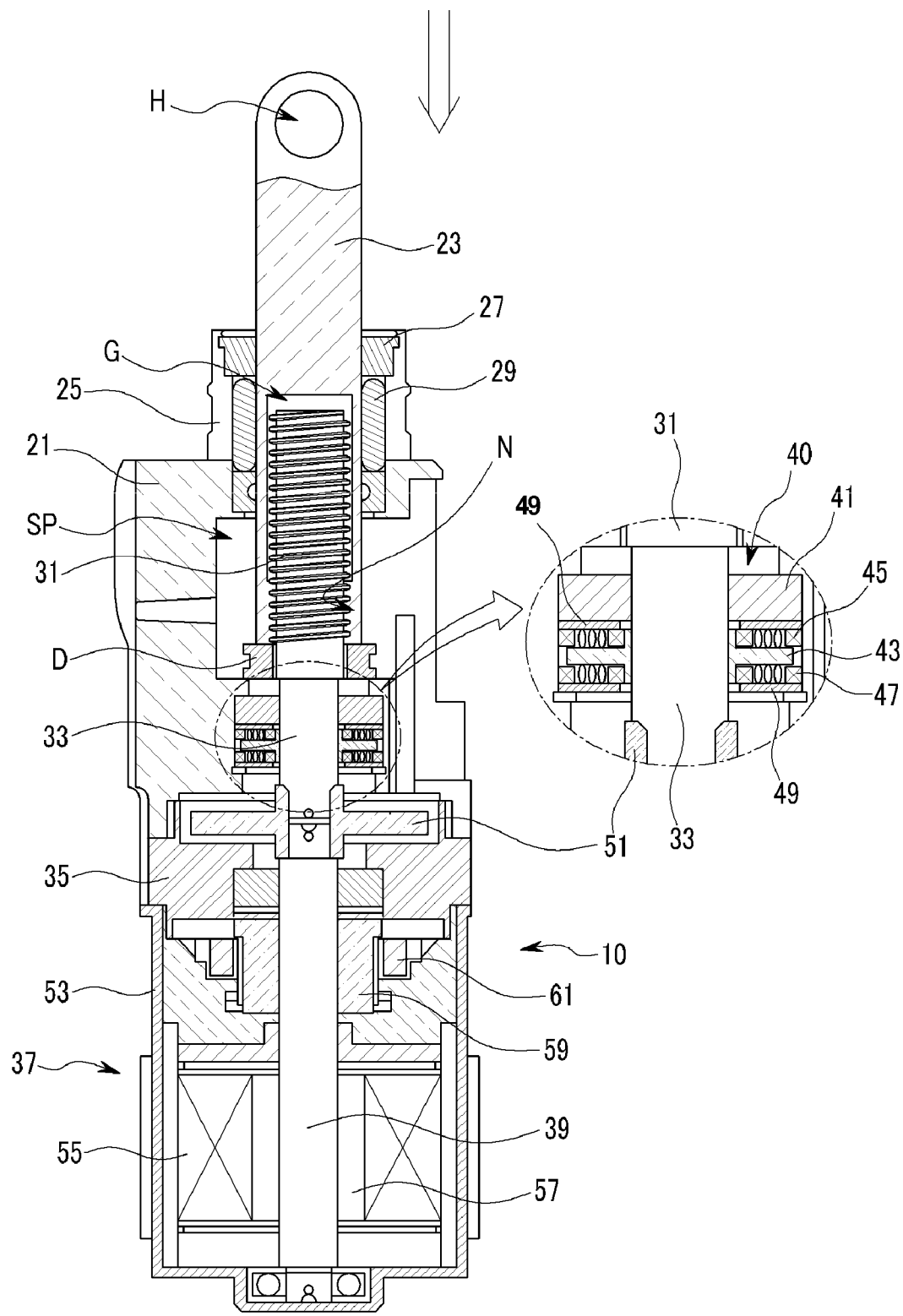
FIG. 4 is a cross-sectional view of an actuator for an exemplary active roll control system according to the present invention.

FIG. 3 is a schematic diagram of a suspension system for vehicles provided with an actuator for an active roll control system according to various embodiments of the present invention; and FIG. 4 is a cross-sectional view of an actuator for an active roll control system according to various embodiments of the present invention.

A suspension system for vehicles provided with an actuator for an active roll control system according to various embodiments of the present invention, as shown in FIG. 3, includes a chassis spring 1 relieving impact from a road and mounted between a vehicle body 3 and an axle 5, a shock absorber 7 reducing free vibration of the chassis spring 1 and improving ride comfort, and a stabilizer bar 9 suppressing roll of a vehicle.

The active roll control system includes the actuator 10 connecting a lower arm 11 to the stabilizer bar 9. A lower end of the actuator 10 is connected to the lower arm 11, and an upper end of the actuator 10 is connected to one end of the stabilizer bar 9 so as to change torsional rigidity of the stabilizer bar 9 according to an operation of the actuator 10 and so as to actively improve the roll of the vehicle.

The actuator 10 according to various embodiments of the present invention, as shown in FIG. 4, includes a screw housing 21 having a space SP therein.

A cylindrical power transmitter 23 is slidably mounted at an upper portion of the screw housing 21. An engage hole H is formed at an upper portion of the power transmitter 23 such that the power transmitter 23 is connected to the one end of the stabilizer bar 9 by a joint J, and a screw groove G is formed at a lower interior surface of the power transmitter 23. The screw groove G is provided with a screw thread N formed at an interior surface thereof and is disposed in the space SP of the screw housing 21.

A bush housing 25 is mounted at an upper end of the screw housing 21, and a guide bush 27 contacted to an exterior circumference of the power transmitter 23 and guiding sliding movement of the power transmitter 23 and an oil seal 29 for preventing leakage of oil is mounted in the bush housing 25.

Figure 5:
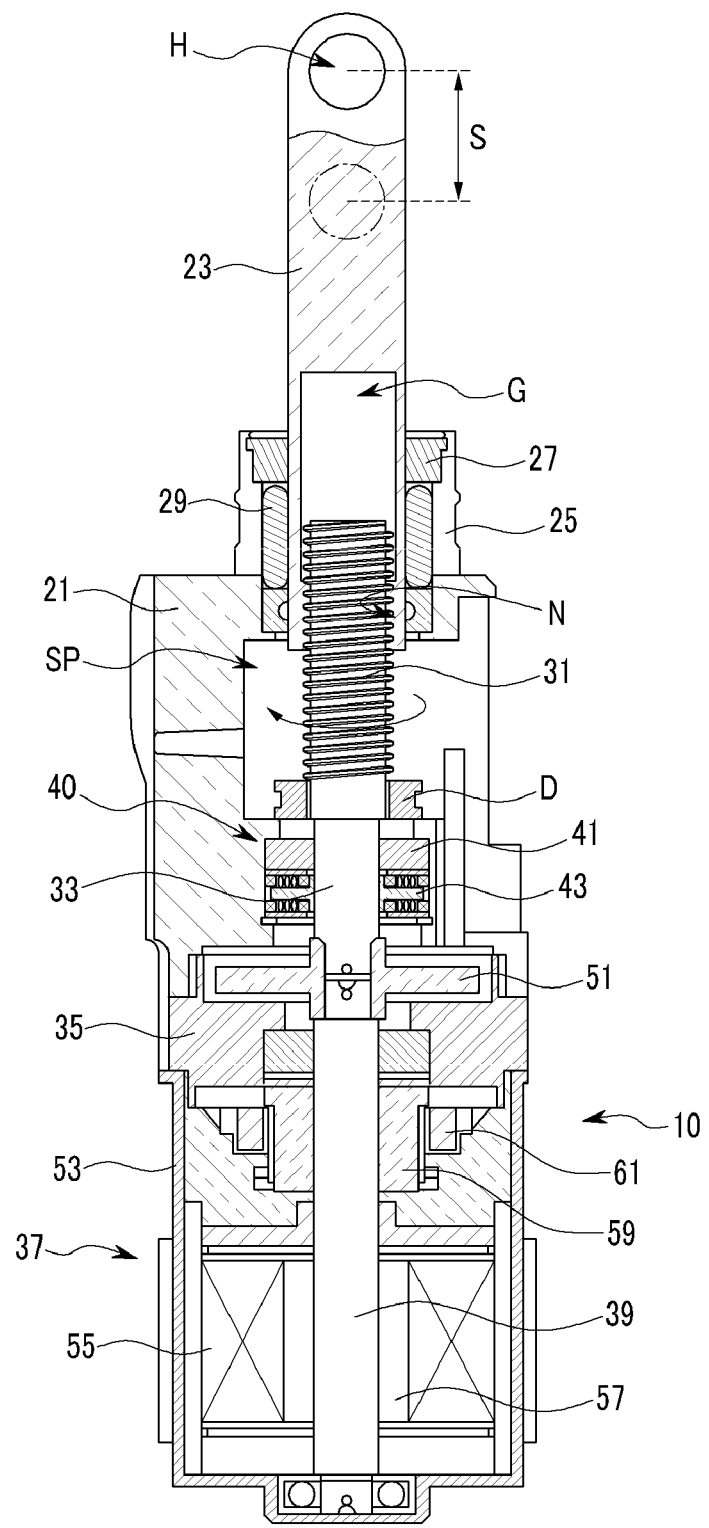
FIG. 5 is a schematic diagram showing an operation of an actuator for an exemplary active roll control system according to the present invention.

In addition, a damper D is mounted at a lower end portion of the space in the screw housing and absorbs impact transmitted from the power transmitter 23 to an interior surface of the space SP in the screw housing 21. The damper D has an annular shape such that a lead screw 31 can go through, as shown in FIGS. 4 and 5.

A lead screw 31 is disposed in the space SP of the screw housing 21, and is insertedly threaded to the screw thread N of the screw groove G. A screw rotation shaft 33 is integrally connected to a lower end of the lead screw 31 along its axial direction.

Impact absorbing unit 40 are interposed between the screw rotation shaft 33 and the screw housing 21, and absorb and disperse the impact transmitted from the vehicle body or the road through the power transmitter 23.

The impact absorbing unit 40 includes a metal bush 41, a thrust disk 43, two thrust bearings 45 and 47, and two bearing plates 49.

The metal bush 41 is mounted in the screw housing 21 in a state of being rotatably inserted on the screw rotation shaft 33, and the thrust disk 43 is disposed under the metal bush 41 and forms seat for respective thrust bearing 45 and 47 in a state of being inserted on the screw rotation shaft 33.

The two thrust bearings 45 and 47 are mounted on the screw rotation shaft 33 corresponding respectively to upper and lower surfaces of the thrust disk 43.

In addition, the bearing plates 49 are mounted respectively at an upper surface of the upper thrust bearing 45 and a lower surface of the lower thrust bearing 47.

Meanwhile, a drive motor 37 is mounted at a lower portion of the screw housing 21 through an end bell 35, and the drive motor 37 may be a step motor capable of controlling rotation speed and rotating direction thereof.

That is, a rotation shaft 39 of the drive motor 37 is connected to the screw rotation shaft 33 through a coupling 51 so as to transmit torque to the lead screw 31. A stator 55 made of a magnet and a rotor 57 on which a coil is wound is provided in the motor housing 53.

A commutator 59 for changing current direction periodically is provided at a lower surface of the end bell 35 connecting the motor housing 53 of the drive motor 37 to the screw housing 21, and a brush 61 is mounted at a radially outward portion of the commutator 59.

Hereinafter, an operation of the actuator 10 for an active roll control system will be described in detail, referring to FIG. 4 and FIG. 5.

In a case that a side of the vehicle at which the actuator 10 is mounted is lifted by turning of the vehicle, the actuator 10, as shown in FIG. 4, plays a downward operation and pulls the one end of the stabilizer bar 9 down. Therefore, the torsional rigidity of the stabilizer bar 9 is increased and the roll of the vehicle is suppressed.

The downward operation of the actuator 10 is controlled by an ECU based on signals output from an acceleration sensor, a vehicle height sensor, a steering sensor. At this time, the ECU controls rotation speed and rotating direction of the drive motor 37, and moves the power transmitter 23 down.

As the power transmitter 23 moves down, the one end of the stabilizer bar 9 positioned at a portion where a vehicle height rises is pulled down. Therefore, the roll of the vehicle body 3 is suppressed.

On the contrary, in a case that the side of the vehicle at which the actuator 10 is mounted goes down, the actuator 10, as shown in FIG. 5, plays an upward operation and pushes the one end of the stabilizer bar 9 up. Therefore, the torsional rigidity of the stabilizer bar 9 is increased and the roll of the vehicle is suppressed.

The upward operation of the actuator 10 is controlled by the ECU based on the signals output from the acceleration sensor, the vehicle height sensor, the steering sensor. At this time, the ECU controls rotation speed and rotating direction of the drive motor 37, and moves the power transmitter 23 up.

As the power transmitter 23 moves up, the one end of the stabilizer bar 9 positioned at a portion where a vehicle height falls is pushed up. Therefore, the roll of the vehicle body 3 is suppressed.

The ECU drives the drive motor 37 through the control of rotation speed and rotating direction of drive motor 37, and torque of the drive motor 37 rotates the lead screw 31 through the screw rotation shaft 33. Therefore, the upward and downward operations of the actuator 10 for an active roll control system are performed.

If the lead screw 31 rotates, the power transmitter 23 moves upwardly or downwardly by a stroke S in a state of being engaged with the lead screw 31.

According to the actuator 10 for an active roll control system, an electric motor is provided, and supply or control of hydraulic pressure is not required. Therefore, the stroke of the actuator 10 may be maximized without a bracket, and layout of the actuator 10 may be simplified.

In addition, since the impact absorbing unit 40 including the metal bush 41 and the thrust disk 43 is interposed between the screw housing 21 and the screw rotation shaft 33, the impact transmitted from the vehicle body and the road through the power transmitter 23 is relieved or dispersed and durability of the drive motor 37 may be improved.

Since the screw thread is formed in an inlet portion of the screw groove and the space of the screw housing encloses a lower portion of the power transmitter, the power transmitter can move along the screw housing with reduced friction, which improves time response.

According to various embodiments of the present invention, controllability may be enhanced and layout may be simplified as a consequence that a lead screw in a screw housing converts rotation movement of a motor into linear reciprocal movement and transmits the linear reciprocal movement to a power transmitter connected to one end of the stabilizer bar by a joint. In addition, layout of the actuator may be further simplified since the hydraulic pressure supply system for supplying and controlling hydraulic pressure including a hydraulic pressure pump, a hydraulic pressure valve, and a hydraulic line is not required.

Furthermore, since the impact absorbing unit including the metal bush and the thrust disk is interposed between the screw housing and the screw rotation shaft, the impact transmitted from the vehicle body and the road through the power transmitter is relieved or dispersed and damage of the drive motor may be prevented.

For convenience in explanation and accurate definition in the appended claims, the terms "upper", "lower" "upward", "downward", "interior", and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator for an active roll control system that connects a stabilizer bar with a lower arm and actively improves roll of a vehicle by changing torsional rigidity of the stabilizer bar according to a driving condition of the vehicle, the actuator comprising:

a screw housing having a space formed therein;

a power transmitter slidably mounted in an upper interior circumference of the screw housing, and having an upper end portion connected to one end of the stabilizer bar by a joint and a lower end portion slidably movable in the space of the screw housing, wherein the lower end portion of the power transmitter includes a screw groove therein and a screw thread is formed at an interior circumference of an inlet portion thereof;

a lead screw being inserted in the screw groove of the power transmitter and threaded to the screw thread of the inlet portion and having a screw rotation shaft integrally connected to a lower end thereof;

a drive motor mounted at a lower portion of the screw housing and having a rotation shaft connected to the screw rotation shaft;

an annular damper for absorbing impact to an interior surface of the space in the screw housing provided at a lower end portion of the space in the screw housing; and an impact absorbing unit disposed between the screw rotation shaft and the screw housing for absorbing and dispersing impact, wherein the impact absorbing unit comprises:

a metal bush mounted in the screw housing in a state of being inserted on the screw rotation shaft;

a thrust disk disposed under the metal bush and insertedly mounted on the screw rotation shaft;

upper and lower thrust bearings inserted on the screw rotation shaft, and mounted corresponding respectively to upper and lower surfaces of the thrust disk; and bearing plates mounted respectively at an upper surface of the upper thrust bearing and lower surface of the lower thrust bearing.

2. The actuator of claim 1, wherein the drive motor is mounted at the lower portion of the screw housing by an end bell.

3. The actuator of claim 1, wherein the rotation shaft of the drive motor is connected to the screw rotation shaft by a coupling.

4. The actuator of claim 1, wherein a bush housing is mounted at an upper end of the screw housing, a guide bush is contacted with an exterior circumference of the power transmitter and guides sliding movement of the power transmitter, and an oil seal for preventing leakage of oil is mounted around the guide bush.

5. The actuator of claim 1, wherein the drive motor is a step motor capable of controlling rotation speed and rotating direction thereof.

* * * * *